United States Patent
Zhang et al.

(10) Patent No.: US 10,931,578 B2
(45) Date of Patent: Feb. 23, 2021

(54) METHOD FOR PROCESSING DATA IN ETHERNET, DEVICE, AND SYSTEM

(71) Applicant: HUAWEI TECHNOLOGIES CO., LTD., Guangdong (CN)

(72) Inventors: Fan Zhang, Bonn (DE); Ming Zhou, Shenzhen (CN); Hui Wang, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/162,163

(22) Filed: Oct. 16, 2018

(65) Prior Publication Data

US 2019/0052562 A1    Feb. 14, 2019

Related U.S. Application Data

(63) Continuation of application No. PCT/CN2016/107507, filed on Nov. 28, 2016.

(30) Foreign Application Priority Data

Apr. 18, 2016   (CN) .......................... 201610239218.1

(51) Int. Cl.
*H04L 12/721* (2013.01)
*H04L 12/64* (2006.01)
(Continued)

(52) U.S. Cl.
CPC ................ *H04L 45/68* (2013.01); *H04J 3/06* (2013.01); *H04J 3/0632* (2013.01); *H04J 3/073* (2013.01);
(Continued)

(58) Field of Classification Search
CPC ....... H04L 45/68; H04L 12/413; H04L 12/46; H04L 12/4625; H04L 12/4633;
(Continued)

(56) References Cited

U.S. PATENT DOCUMENTS 6,094,737 A  *  6/2000  Fukasawa et al.
8,040,887 B2    10/2011 Boutaud De La Combe et al.
(Continued)

FOREIGN PATENT DOCUMENTS

CN  1617469 A   5/2005
CN  1859063 A   11/2006
(Continued)

OTHER PUBLICATIONS

"ITU-T G.707/Y.1322 Implementers' Guide, Series G: Transmission Systems and Media, Digital Systems and Networks Digital terminal equipments—General Series Y: Global Information Infrastructure, Internet Protocol Aspects and Next-Generation Networks Internet protocol aspects—Transport, Implementers' Guide for definitions and terms found in Recommendation ITU T G.707/Y.1322, Jun. 11, 2010, 6 pages".

(Continued)

*Primary Examiner* — Andrew Lai
*Assistant Examiner* — Mohammed M Murshid
(74) *Attorney, Agent, or Firm* — Womble Bond Dickinson (US) LLP

(57) ABSTRACT

A data processing method, a related device, and a system are provided. The method executed by a first network device includes receiving PDH frame data; loading the PDH frame data and a stuffing bit into a virtual container to obtain the virtual container that includes the PDH frame data, where the stuffing bit in the virtual container carries information about a clock frequency difference between a clock frequency of the Ethernet and a clock frequency of the PDH frame data; and performing virtual-container PWE3 encapsulation on the virtual container to obtain a virtual-container PWE3 packet. In at least some embodiments, difficulty in recovering the clock frequency of the PDH frame data when the PDH frame data is transmitted in the Ethernet is reduced, (Continued)

clock frequency jitters and drifts caused by the clock frequency recovery are reduced, and user experience is improved.

11 Claims, 8 Drawing Sheets

(51) Int. Cl.
*H04J 3/16* (2006.01)
*H04J 3/06* (2006.01)
*H04J 3/07* (2006.01)
*H04L 12/413* (2006.01)
*H04L 12/46* (2006.01)

(52) U.S. Cl.
CPC .............. *H04J 3/16* (2013.01); *H04J 3/1635* (2013.01); *H04L 12/413* (2013.01); *H04L 12/46* (2013.01); *H04L 12/4625* (2013.01); *H04L 12/4633* (2013.01); *H04L 12/6418* (2013.01); *H04J 2203/0094* (2013.01); *H04L 2012/6486* (2013.01)

(58) Field of Classification Search
CPC .......... H04L 12/6418; H04L 2012/6486; H04J 3/16; H04J 3/06; H04J 3/073; H04J 3/0632; H04J 3/1635; H04J 2203/0094
See application file for complete search history.

(56) References Cited

U.S. PATENT DOCUMENTS

| | | | |
|---|---|---|---|
| 2006/0216041 A1* | 9/2006 | Hotta et al. | |
| 2007/0047575 A1* | 3/2007 | Cui .................... | H04L 12/4633 370/465 |
| 2009/0097506 A1 | 4/2009 | Subrahmanyan et al. | |
| 2009/0162061 A1* | 6/2009 | Kisaka ................. | H04J 3/1652 398/52 |
| 2011/0135304 A1* | 6/2011 | Katagiri .................... | H04J 3/07 398/45 |
| 2011/0261812 A1* | 10/2011 | Kini ........................ | H04L 45/50 370/389 |
| 2012/0155476 A1 | 6/2012 | Pavani et al. | |
| 2013/0039659 A1 | 2/2013 | Li | |

FOREIGN PATENT DOCUMENTS

| | | |
|---|---|---|
| CN | 101471740 A | 7/2009 |
| CN | 101707553 A | 5/2010 |
| CN | 101848147 A | 9/2010 |
| CN | 1949700 B | 10/2010 |
| CN | 102025438 A | 4/2011 |
| CN | 102480408 A | 5/2012 |
| CN | 102497311 A | 6/2012 |
| CN | 105933087 A | 9/2016 |
| EP | 1760976 A1 | 3/2007 |
| EP | 1780957 A1 | 5/2007 |
| WO | 2009037002 A1 | 3/2009 |

OTHER PUBLICATIONS

ITU-T G.707/Y.1322 Amendment 2(Nov. 2009), Series G: Transmission Systems and Media, Digital Systems and Networks Digital terminal equipments—General, Series Y: Global Information Infrastructure, Internet Protocol Aspects and Next-Generation Networks Internet protocol aspects—Transport, Network node interface for the synchronous digital hierarchy (SDH), Nov. 2009, 10 pages.

"ITU-T G.707/Y.1322, Series G: Transmission Systems and Media, Digital Systems and Networks Digital terminal equipments—General Series Y: Global Information Infrastructure, Internet Protocol Aspects and Next-Generation NetworksInternet protocol aspects—Transport, Network node interface for the synchronous, digital hierarchy (SDH), Jan. 2007, 196 pages".

A. Malis et al, Synchronous Optical Network/Synchronous Digital Hierarchy (SONET/SDH) Circuit Emulation over Packet (CEP). RFC4842, Apr. 2007, 43 pages.

* cited by examiner

METHOD FOR PROCESSING DATA IN ETHERNET, DEVICE, AND SYSTEM

CROSS-REFERENCE TO RELATED APPLICATIONS

This application is a continuation of International Application PCT/CN2016/107507, filed on Nov. 28, 2016, which claims priority to Chinese Patent Application No. 201610239218.1, filed on Apr. 18, 2016. The disclosures of the aforementioned applications are hereby incorporated by reference in their entireties.

TECHNICAL FIELD

This application relates to the field of communications technologies, and in particular, to a method for processing data in Ethernet, a related device, and a system.

BACKGROUND

With maturity, development, and evolution of Ethernet packet bearer network technologies, a mainstream operator has begun to gradually use an Ethernet packet device to reconstruct, upgrade, and replace an existing bearer network of a time division multiplexing (TDM) architecture such as a multi-service transmission platform (MSTP). However, due to factors such as operator's capital investment and a network construction plan, the Ethernet packet device will be networked with massive synchronous digital hierarchy (SDH) and MSTP devices in the existing network in a hybrid manner for a relatively long period of time, so as to gradually implement hitless switching of a service in the existing network.

A hybrid networking network includes an Ethernet network element and an SDH/MSTP network element. The Ethernet network element may be a packet-based packet transport network (PTN) network element. In a typical plesiochronous digital hierarchy (PDH) private line service scenario, PDH frame data is usually transmitted between an Ethernet network element and an SDH network element. The PDH frame data includes data such as an E1 frame, a T1 frame, an E3 frame, a T3 frame, or an E4 frame. In a hybrid networking structure, how to recover a PDH-service-based clock frequency is an important issue.

A scenario in which an Ethernet network element and an SDH network element are interconnected is used as an example. Ethernet includes a first Ethernet network element and a second Ethernet network element, and the second Ethernet network element is connected to the SDH network element by using an SDH interface. In this scenario, a process of recovering a clock frequency of PDH frame data is approximately as follows.

The first Ethernet network element transmits PDH frame data to the second Ethernet network element. The first Ethernet network element obtains clock frequency information corresponding to the PDH frame data, and obtains information about a difference between a clock frequency of the Ethernet and a clock frequency of the PDH frame data according to the clock frequency of the Ethernet and the clock frequency of the PDH frame data. The difference information is carried in information about a fixed field in pseudo-wire emulation edge-to-edge (PWE3) encapsulation. The first Ethernet network element sends an encapsulated PWE3 packet to the second Ethernet network element. Because clock frequencies in the Ethernet are the same, the second Ethernet network element may obtain, according to the difference information and clock frequency information of the Ethernet, the clock frequency information corresponding to the PDH frame data.

In the foregoing solution, the following process needs to be independently performed for transmitting each piece of PDH frame data from an Ethernet network element to another Ethernet network element interconnected to the SDH: sampling a clock frequency of the PDH frame data to obtain information about a difference between the clock frequency of the PDH frame data and the clock frequency of the Ethernet, performing encapsulation, performing decapsulation, and recovering the clock frequency of the PDH frame data. Usually, on a UNI port on which the first Ethernet network element and the second Ethernet network element are interconnected, PDH frame data of multiple channels converge into one synchronous transport module (STM)-level SDH data stream by using multiplexing. Therefore, in the foregoing manner, considerable technical challenges are faced in resource implementation and clock frequency recovery performance. In addition, the second Ethernet network element needs to use the calculated rate difference information to recover the clock frequency of the PDH frame data, and remapping and multiplexing processing need to be performed on a virtual container into which the PDH frame data is loaded. Therefore, recovery of the clock frequency of the PDH frame data and virtual-container mapping are inevitably performed multiple times, and consequently, an original jitter and drift indicator of the clock frequency of the PDH frame data degrades.

SUMMARY

Embodiments of this application provide a method for processing data in Ethernet, a related device, and a system, so as to reduce difficulty) in recovering a clock frequency of PDH frame data when the PDH frame data is transmitted in the Ethernet, reduce clock frequency jitters and drifts caused by the clock frequency recovery, and improve user experience.

In at least one embodiment, a method for processing data in Ethernet, where the Ethernet includes a first network device and a second network device, the first network device is coupled with the second network device by using the Ethernet, includes:

receiving, by the first network device, plesiochronous digital hierarchy PDH frame data, where the PDH frame may be E1 frame data, a T1 frame, an E3 frame, an E4 frame, a T4 frame, or the like:

performing, by the first network device, virtual-container mapping processing on the PDH frame data: loading the PDH frame data and a stuffing bit into a virtual container, to obtain the virtual container that includes the PDH frame data, where the stuffing bit carries information about a clock frequency difference between a clock frequency of the Ethernet and a clock frequency of the PDH frame data, and the virtual container may be a VC-11, a VC-12, a VC-2, a VC-4, or the like;

performing, by the first network device, virtual-container pseudo-wire emulation edge-to-edge PWE3 encapsulation on the virtual container to obtain virtual-container PWE3 encapsulated data, and obtaining, by the first network device, a virtual-container PWE3 packet according to the virtual-container PWE3 encapsulated data, and sending the virtual-container PWE3 packet to the second network device by using the Ethernet.

In at least one embodiment, virtual-container mapping processing is directly performed on the PDH frame data without a need to directly obtain an actual value of the clock frequency of the PDH frame data by using calculation, and the information about the clock frequency difference between the clock frequency of the Ethernet and the clock frequency of the PDH frame data is reflected by using the stuffing bit, so that difficulty in recovering the clock frequency of the PDH frame data in multiple PDH services in an Ethernet network element is reduced, clock frequency jitters and drifts caused by multi-level clock frequency recovery are reduced, and user experience is improved.

In at least one embodiment, before the performing, by the first network device, virtual-container mapping processing on the PDH frame data to obtain the virtual container that includes the PDH frame data, the method for processing data in Ethernet further includes obtaining, by the first network device, first alarm information, where the first alarm information is used to indicate monitored quality of the PDH frame data, for example, the first alarm information indicates whether the PDH frame data carries valid data (for example, whether the PDH frame data is a null packet) or whether there is bit-level bit error information; and placing, by the first network device, the first alarm information in a path overhead POH of the virtual container.

The second network device extracts the first alarm information from the POH of the virtual container, to determine whether the PDH frame data in the virtual container of the currently received packet includes valid data and so on, so that data processing efficiency is improved.

In at least one embodiment, before the obtaining, by the first network device, the virtual-container PWE3 packet according to the virtual-container PWE3 encapsulated data, the method for processing data in Ethernet further includes:

obtaining, by the first network device, second alarm information, where the second alarm information is used to indicate a status of an Ethernet path between the first network device and the second network device; and placing, by the first network device, the second alarm information in the POH of the virtual container.

The second network device extracts the first alarm information from the POH of the virtual container, to determine a current status of the Ethernet path, so that the second network device can subsequently use a valid Ethernet path for interaction.

In at least one embodiment a method for processing data in Ethernet, where the Ethernet includes a first network device and a second network device, the first network device is coupled with the second network device by using the Ethernet includes receiving, by the second network device, a virtual-container pseudo-wire emulation edge-to-edge PWE3 packet sent by the first network device, where the virtual-container PWE3 packet includes plesiochronous digital hierarchy PDH frame data; and performing, by the second network device, virtual-container PWE3 decapsulation on the virtual-container PWE3 packet to obtain a virtual container that includes the PDH frame data, where the virtual container further includes a stuffing bit, and the stuffing bit carries information about a clock frequency difference between a clock frequency of the Ethernet and a clock frequency of the PDH frame data.

In at least one embodiment, in the virtual-container PWE3 packet, the stuffing bit carries the information about the clock frequency difference between the clock frequency of the Ethernet and the clock frequency of the PDH frame data, so that difficulty in recovering the clock frequency of the PDH frame data in multiple PDH services in an Ethernet network element is reduced, clock frequency jitters and drifts caused by multi-level clock frequency recovery are reduced, and user experience is improved.

In at least one embodiment, a POH of the virtual container includes first alarm information, and the first alarm information is used to indicate monitored quality of the PDH frame data; and after the performing, by the second network device, virtual-container PWE3 decapsulation on the virtual-container PWE3 packet, the method for processing data in Ethernet further includes:

extracting, by the second network device, the first alarm information from the POH.

In at least one embodiment, the POH of the virtual container includes second alarm information, and the second alarm information is used to indicate a status of an Ethernet path between the first network device and the second network device; and before the performing, by the second network device, virtual-container PWE3 decapsulation on the virtual-container PWE3 packet, the method further includes:

extracting, by the second network device, the second alarm information from the POH.

In at least one embodiment, the method for processing data in Ethernet further includes obtaining, by the second network device, multiple virtual containers obtained after the virtual-container PWE3 decapsulation, and multiplexing the multiple virtual containers into tributary units by using interleaving.

In at least one embodiment, the method for processing data in Ethernet further includes performing, by the second network device, virtual-container demapping processing on the virtual container to obtain the PDH frame data and the stuffing bit that are stored in the virtual container:

obtaining, by the second network device, the information about the clock frequency difference according to the stuffing bit; and obtaining, by the second network device, the clock frequency of the PDH frame data according to the information about the clock frequency difference and a clock frequency of the second network device.

In at least one embodiment, a network device is applied to Ethernet that includes a target network device. The network device is connected to the target network device by using the Ethernet. In at least one embodiment, the network device has functions of performing the one or more methods as described herein. The functions may be implemented by using hardware, or may be implemented by executing corresponding software by hardware. The hardware or software has one or more modules corresponding to the functions.

In at least one embodiment, a network device is applied to Ethernet that includes a target network device. The network device is connected to the target network device by using the Ethernet. The network device includes a transceiver and a processor, and the network device is configured to perform one or more methods as described herein.

In at least one embodiment, a communications system includes a first network device and a second network device, where the first network device is coupled with the second network device by using Ethernet. Each of the first network device and second network device represents one of the network devices as described herein.

In at least one embodiment, a computer storage medium is configured to store a computer software instructions including a program designed for performing the one or more methods as described herein.

DESCRIPTION OF EMBODIMENTS

Figure 1:
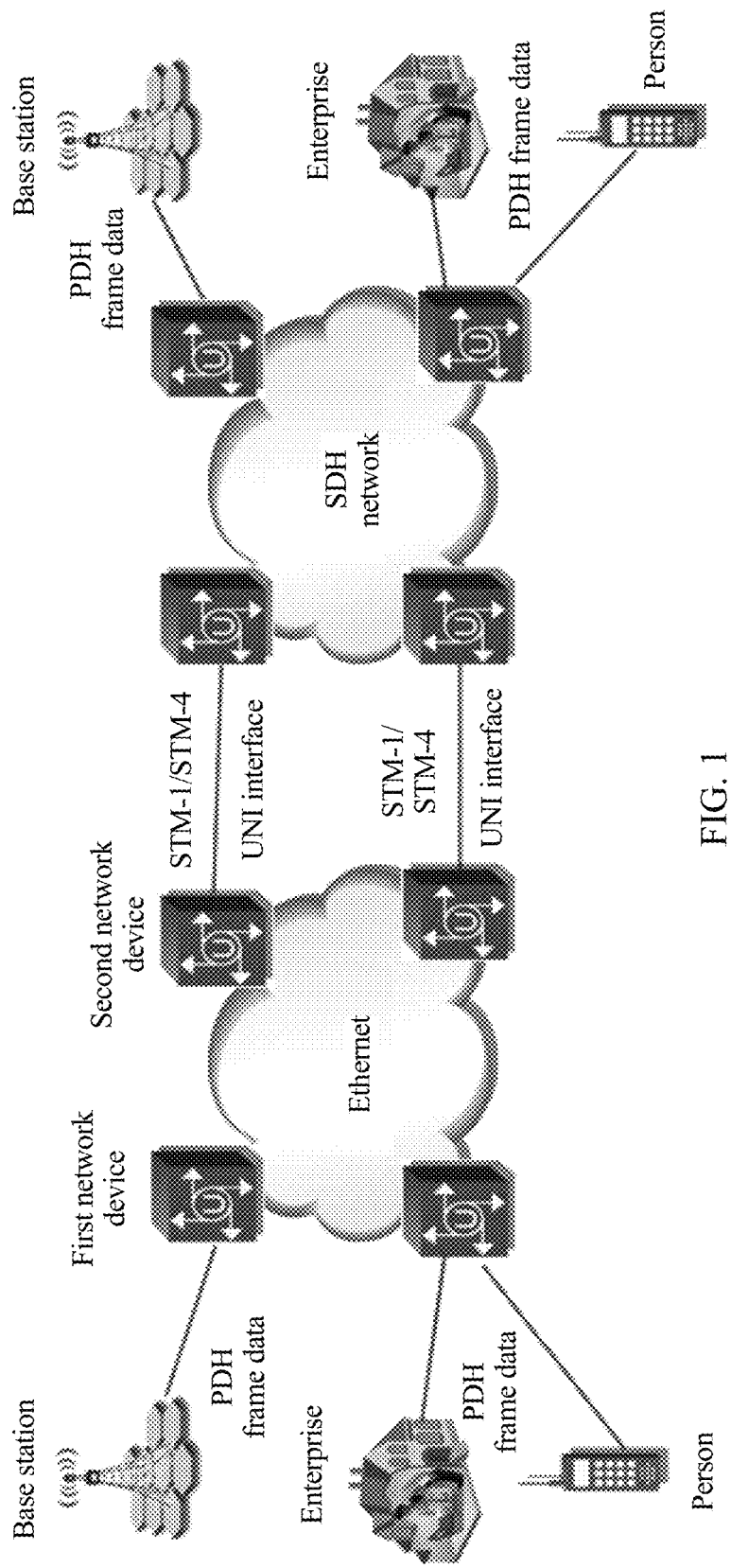
FIG. 1 is a schematic diagram of a hybrid networking architecture according to one embodiment.

To make one of ordinary skill in the art understand the solutions in this application better, the following clearly describes the technical solutions in the embodiments of the invention with reference to the accompanying drawings in the embodiments of the invention. Apparently, the described embodiments are merely some rather than all of the embodiments of the invention. All other embodiments obtained by one of ordinary skill in the art based on the embodiments of the invention without creative efforts shall fall within the protection scope of the embodiments of the invention.

The terms "first", "second", and the like (if existent) mentioned in the embodiments of the invention are intended to distinguish between similar objects but do not necessarily indicate a specific order or sequence. It should be understood that the data termed in such a way are interchangeable in proper cases so that the embodiments described herein can be implemented in other orders than the order illustrated or described herein. Moreover, the terms "include", "has", and any other variants thereof mean to cover the non-exclusive inclusion. For example, a process, method, system, product, or device that includes a series of operations or units is not necessarily limited to those operations or units expressly listed, but may include other operations or units that are not expressly listed or inherent to such a process, method, product, or device.

For ease of understanding the embodiments of the invention, several elements used to describe the embodiments of the invention are first described herein.

European 30-channel pulse code modulation (PCM) is briefly referred to as E1, and has a rate of 2.048 Mbit/s. One time division multiplexing frame (whose length T=125 us) of the E1 is divided into 32 equal timeslots in total, and numbers of the timeslots are CH0 to CH31. The timeslot CH0 may be used for frame synchronization. The timeslot CH16 may be used to transmit signaling. The total 30 timeslots CH1 to CH15 and CH17 to CH31 are used as 30 speech channels. 8 bits are transmitted per timeslot, and therefore 256 bits are used in total. 8000 frames are transmitted per second. Therefore, a data rate of a primary group E1 is 2.048 Mbit/s. Certainly, all the CH0 to CH31 may be used as 32 speech channels.

North America 24-channel pulse code modulation is briefly referred to as T1, and has a rate of 1.544 Mbit/s. The T1 system used in the North America has 24 speech channels in total. For each speech channel, 7 bits are used to encode a sampling pulse, and 1 bit is used for transmit a signaling element. Therefore, one speech channel occupies 8 bits. A 1-bit frame synchronization code is added after the 24 channels are encoded. In this way, each frame has 193 bits in total. Therefore, a data rate of a primary group T1 is 1.544 Mbit/s.

Lower rate data signals are multiplexed into a higher rate data stream that is referred to as a group such as a primary group E1 or T1. When a higher data rate is required, a multiplexing method may be used. Four primary groups may constitute one secondary group. For example, four E1s may constitute one E2, and four T1s constitute one T2. Other groups such as T3, E3, and T4 may be constituted in a similar manner.

A container (C) is an information structural unit used to load service signals of various rates. G.709 specifies, for a PDH rate series, five types of standard containers: a C-11, a C-12, a C-2, a C-3, and a C-4. The C-12 is used to encapsulate a 2-Mbit/s signal, such as an E1 frame. The C-11 is used to encapsulate a signal whose transmission rate is 1.5 Mbit/s, such as a T1 frame. The C-2 is used to encapsulate a signal whose transmission rate is 6 Mbit/s, such as a T2 frame; or a signal whose transmission rate is 8 Mbit/s such as an E2 frame. The C-3 is used to encapsulate a signal whose transmission rate is 45 Mbit/s, such as a T3 frame; or a signal whose transmission rate is 34 Mbit/s, such as an E3 frame. The C-4 is used to encapsulate a signal whose transmission rate is 139 Mbit/s, such as an E4 frame.

A virtual container (VC) is a concept in the SDH. The virtual container is an information structure used to support path layer connections. The virtual container includes an information payload (that is, a container) and a path overhead (POH), that is:

$$VC\text{-}n = C\text{-}n + VC\text{-}n POH,$$

where VC-n is an n-order virtual container, C-n is an n-order container, VC-n POH is a path overhead of the n-order virtual container, and a value of n is, for example, 2, 3, 4, 11, or 12. Alignment information for identifying a VC frame start is provided by a serving network. After various services are processed and then loaded into virtual containers, a system can process data only with a need to process various virtual containers, regardless of specific information structures. Therefore, better information transparency is provided, and a quantity of management entities is reduced.

Currently, two types of virtual containers have been determined: a lower order virtual container and a higher order virtual container. The lower order virtual container VC-n (such as the VC-11, the VC-12, and the VC-2) includes an n-order container and a corresponding lower order virtual container path overhead VC POH. The higher order virtual container VC-n (such as the VC-4) includes an n-order container or a set (such as a TUG-2 or a TUG-3) of some tributary units (Tributary Unit, TU), and further includes a corresponding higher order VC POH.

A packet encapsulation rate of a VC is synchronized with a transmission network. Therefore, different VCs are synchronized with each other. However, the VCs are allowed to internally load asynchronous payloads from different containers. The VC (except a combination point and a decomposition point of the VC) always remains intact during transmission in the transmission network. Therefore, the VC may be used as an independent entity, and be very easy and flexible to insert and remove at any point in a path, so as to facilitate synchronous multiplexing and cross-connection processing.

A tributary unit (TU) is an information structure that provides adaptation between a lower order path layer and a higher order path layer.

There are four types of tributary units, that is, TU-n (n=11, 12, 2, and 3). The TU-n includes a corresponding lower order VC-n and a corresponding tributary unit pointer (TU-n PTR). The tributary unit pointer (TU-n PTR) indicates an offset of a VC-n payload start relative to a higher order VC frame start.

One TU or a set of multiple TUs, occupying fixed and defined positions in a higher order VC payload is referred to as a tributary unit group (TUG).

FIG. 1 is a diagram of a hybrid networking architecture according to an embodiment of the invention. In the hybrid networking structure, an Ethernet side includes a first network device and a second network device that are interconnected by using Ethernet. The second network device is connected to an SDN network element by using a user network interface (UNI). The first network device may receive PDH frame data sent by an enterprise, a private line, a person, a base station, or the like. The PDH frame data includes frame data such as an E1 frame, a T1 frame, an E3 frame, a T3 frame, or an E4 frame. In addition, the first network device transmits the received PDH frame data to the second network device by using the Ethernet. The second network device transmits a synchronous transport module (STM)-level data frame to the SDN network element by using the UNI interface. Recovery of a clock frequency of the PDH frame data is an important factor when the PDH frame data is transmitted between the first network device and the second network device in the Ethernet.

The following describes an embodiment of a data processing method according to an embodiment of the invention. The data processing method in this embodiment of the invention may be applied to the first network device and the second network device on the Ethernet side in the networking architecture diagram shown in FIG. 1. Both a first network device and a second network device in this embodiment of the invention are Ethernet network elements, and specifically, may be access layer devices or aggregation layer devices, such as access layer routers, aggregation layer routers, access layer switches, or aggregation layer switches. For example, the first network device may be the first network device in FIG. 1. The first network device may receive PDH frame data from a base station, a person, or an enterprise. The second network device is connected to an SDH network element in an SDH network by using a UNI interface. The second network device sends a multiplexed STM-level data frame to the SDH network element such as an STM-1, an STM-4, an STM-16, or an STM-64 by using the UNI interface. A transmission rate of the STM-1 is 155 MBit/s, a transmission rate of the STM-4 is 622 MBit/s, a transmission rate of the STM-16 is 2.5 GBit/s, and a transmission rate of the STM-64 is 10 GBit/s.

Figure 2:
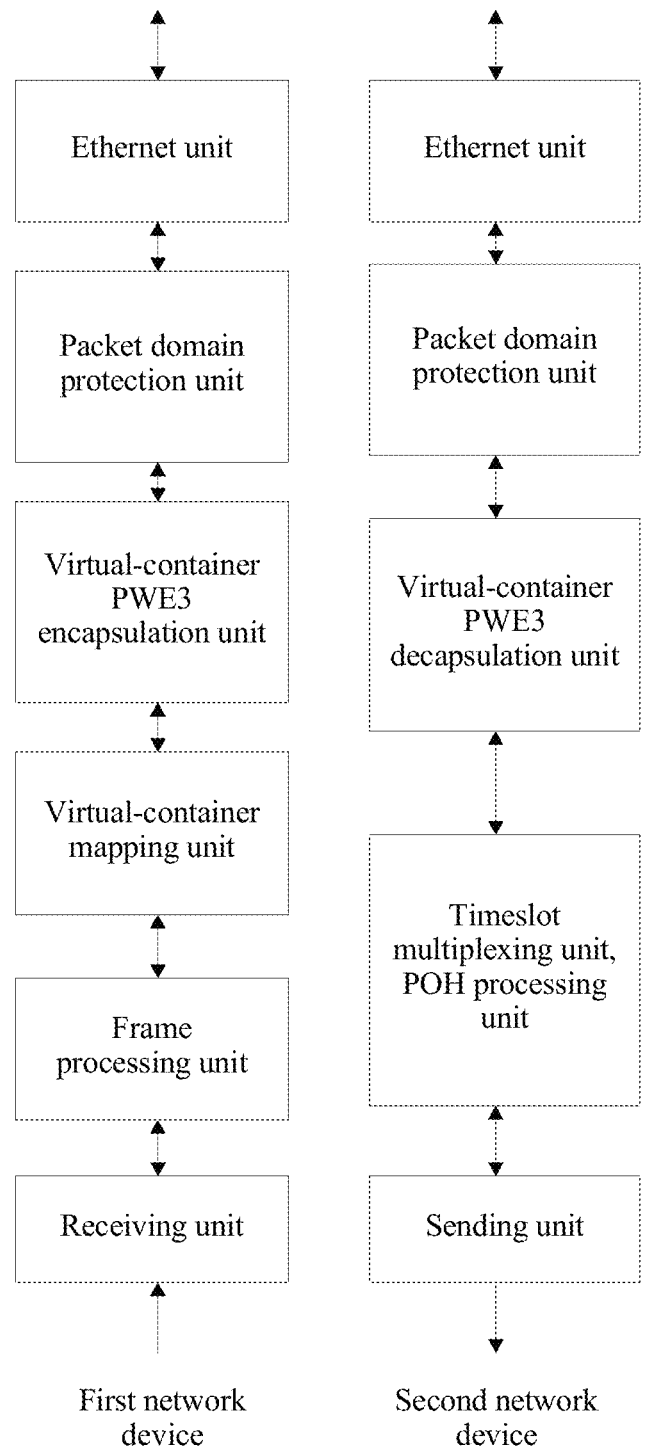
FIG. 2 is a schematic diagram of an embodiment scenario in which a first network device and a second network device process data according to an embodiment of the invention.

An implementation solution for processing PDH frame data according to an embodiment of the invention is shown in FIG. 2. A first network device may include a receiving unit, a frame processing unit, a virtual-container mapping unit, a virtual-container PWE3 encapsulation unit, a packet domain protection unit, a sending unit, and the like.

The receiving unit is configured to receive PDH frame data sent by an enterprise, a private line, a person, a base station, or the like. The PDH frame may be an E1 frame, a T1 frame, an E3 frame, an E4 frame, a T4 frame, or the like. The receiving unit may be an interface unit of a corresponding packet, such as an E1 interface unit or a T1 interface unit.

The frame processing unit is configured to perform performance monitoring on the PDH frame data received by the receiving unit, to detect whether the PDH frame data carries valid data, whether there is bit-level bit error information, and so on, so as to generate corresponding first alarm information. During virtual-container mapping, the first alarm information is placed in a POH of a virtual container.

The virtual-container mapping unit is configured to perform virtual-container mapping processing on the PDH frame data to obtain a virtual container that includes the PDH frame data, so that a stuffing bit in the container carries information about a clock frequency difference between a clock frequency of the Ethernet and a clock frequency of the PDH frame data.

The virtual-container PWE3 encapsulation unit is configured to perform virtual-container PWE3 encapsulation on the virtual container obtained after the virtual-container mapping processing. The packet domain protection unit may be configured to: detect Ethernet path status information, and generate second alarm information for an Ethernet path status. The second alarm information is added to the POH of the virtual container for carrying. The second alarm information is used to indicate a status of an Ethernet path between the first network device and a second network device, for example, a specific faulty Ethernet path between the first network device and the second network device. The sending unit is configured to send a virtual-container PWE3 packet to the second network device by using the Ethernet.

The second network device may include a receiving unit, a packet domain protection unit, a virtual-container PWE3 decapsulation unit, a timeslot multiplexing unit, a POH processing unit, a sending unit, and the like.

The receiving unit is configured to receive the virtual-container PWE3 packet sent by the second network device.

The packet domain protection unit is configured to: determine whether a packet obtained after Ethernet decapsulation includes alarm information that the packet domain protection unit can process, and if the packet domain protection unit cannot process the alarm information, continue to transmit the alarm information to an SDH network element. For example, if a POH of a virtual container of the packet obtained after the Ethernet decapsulation includes alarm information, the packet domain protection unit may extract and process the alarm information, or may extract the alarm information and then add the alarm information to other alarm information obtained by the packet domain protection unit in advance. If the packet domain protection unit finds, in a POH of a virtual container of the packet obtained after the Ethernet performs decapsulation, no alarm information that the packet domain protection unit can process, the packet domain protection unit may directly continue to transmit the alarm information to the subsequent SDH network element. For example, when the POH has no Ethernet path status information that the packet domain protection unit can process, the second network device does not need to demap the virtual container obtained after virtual-container PWE3 decapsulation. In this case, if the POH further includes some other alarm information, for example, alarm information of a type such as whether the PDH frame data in the virtual container carries valid data or whether there is bit-level bit error information, the other alarm information may continue to be transmitted to the subsequent SDH network element.

The virtual-container PWE3 decapsulation unit is configured to decapsulate the virtual-container PWE3 packet. The POH processing unit is configured to extract POH field information from the virtual container. The timeslot multiplexing unit is configured to multiplex, by using interleaving, multiple lower order virtual containers obtained after multiple virtual-container PWE3 packets are decapsulated. The sending unit may be configured to send a multiplexed STM-level data frame to the SDH network element.

It may be understood that the second network device may further include a frame processing unit, a virtual-container mapping unit, a virtual-container PWE3 encapsulation unit, and the like that are similar to those in the first network device, so as to implement functions of the foregoing units in the first network device. The receiving unit in the second network device may be further configured to receive the PDH frame data sent by the enterprise, the private line, the person, the base station, or the like. The packet domain protection unit in the second network device may be further configured to: before the first network device obtains the virtual-container PWE3 packet according to virtual-container PWE3 encapsulated data, obtain the second alarm information, and place the second alarm information in the POH of the virtual container. The sending unit in the second network device may be further configured to send the virtual-container PWE3 packet to the first network device by using the Ethernet.

Likewise, the first network device may further include a virtual-container PWE3 decapsulation unit, a timeslot multiplexing unit, and a POH processing unit that are similar to those in the second network device, so as to implement functions of the foregoing units in the second network device. The receiving unit in the first network device may be further configured to receive the virtual-container PWE3 packet sent by the second network device. The packet domain protection unit in the first network device may be further configured to extract the second alarm information from the POH of the virtual container before the virtual-container PWE3 decapsulation unit in the first network device performs virtual-container PWE3 decapsulation on the virtual-container PWE3 packet. In this case, both the first network device and the second network device can complete a process of processing the PDH frame data in the Ethernet on a first network device side and a second network device side.

The following describes a method for processing data in Ethernet according to an embodiment of the invention.

Figure 3:
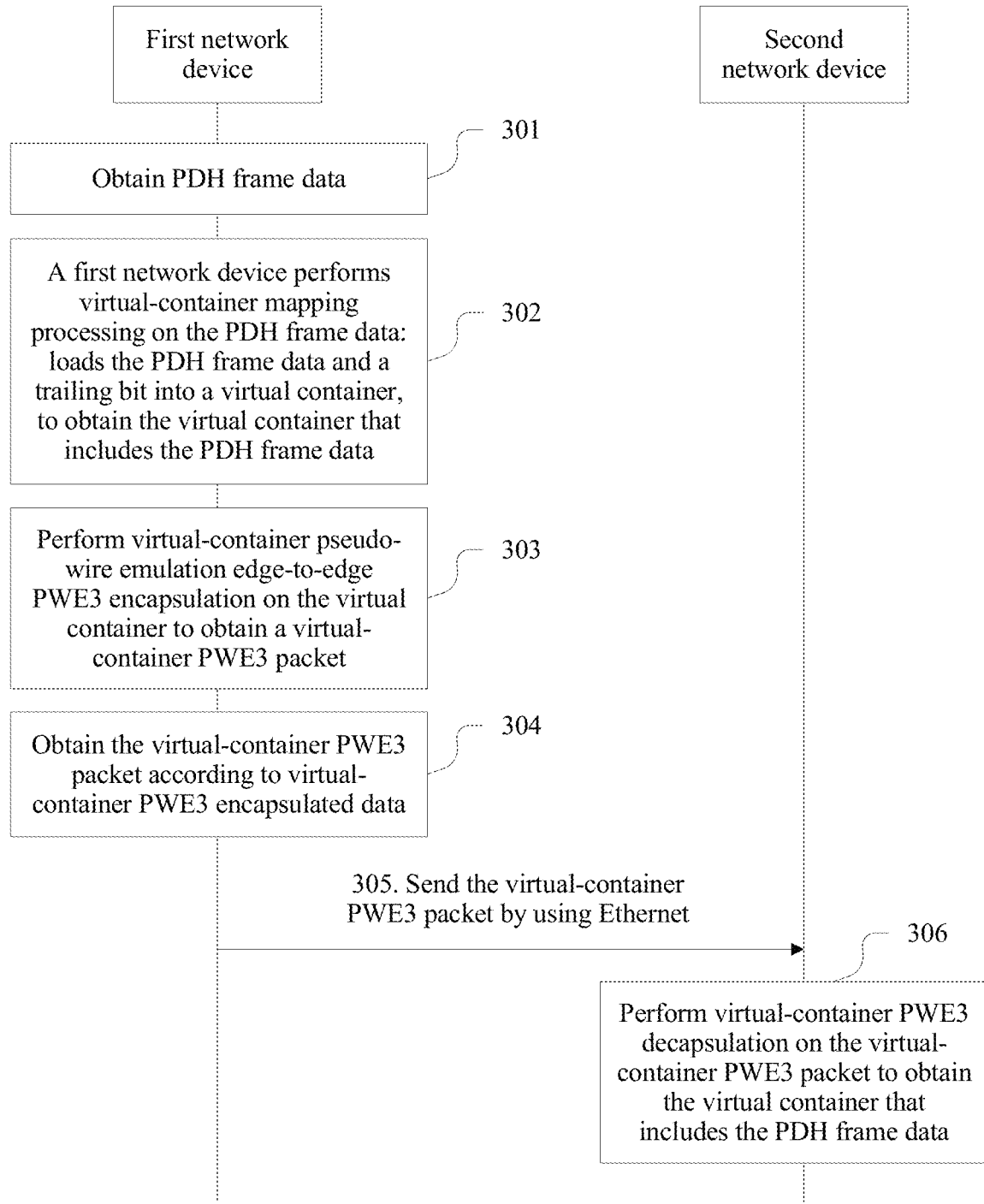
FIG. 3 is a schematic diagram of an embodiment of a data processing method according to an embodiment of the invention.

Referring to FIG. 3, an embodiment of a method for processing data in Ethernet according to an embodiment of the invention includes the following operations.

301. A first network device receives PDH frame data.

The PDH frame data received by the first network device may be PDH frame data processed by a frame processing unit in the first network device, or may be PDH frame data directly received from the person, the enterprise, or the base station shown in FIG. 1.

302. The first network device performs virtual-container mapping processing on the PDH frame data: loads the PDH frame data and a stuffing bit into a virtual container, to obtain the virtual container that includes the PDH frame data.

The virtual container includes a container and a path overhead POH. When performing virtual-container mapping processing on the PDH frame data, the first network device loads the PDH frame data into the container. Justification is performed when the PDH frame data is loaded into the container. The justification is performed by using the stuffing bit (also referred to as a justification bit), that is, the PDH frame data and the stuffing bit are loaded into the virtual container to obtain the virtual container that includes the PDH frame data. In an SDH networking technology, when PDH frame data is loaded into a container, a positive stuffing bit and a negative stuffing bit for justification are specified, so that a clock frequency obtained by adding the stuffing bit to a clock frequency of the PDH frame data is equal to a clock frequency of the Ethernet, or equal to a rate obtained after a clock frequency of the Ethernet is divided, or equal to a rate obtained after a clock frequency of the Ethernet is multiplied. A justification manner may be, for example, as follows: When the clock frequency of the Ethernet is greater than a PDH frame rate, justification is performed by using the positive stuffing bit. When the clock frequency of the Ethernet is less than a PDH frame rate, justification is performed by using the negative stuffing bit. In this case, the stuffing bit (for example, the positive or negative stuffing bit) in the virtual container carries information about a clock frequency difference between the clock frequency of the Ethernet and the clock frequency of the PDH frame data.

Optionally, before the first network device performs virtual-container mapping processing on the PDH frame data to obtain the virtual container that includes the PDH frame data, the method further includes:

obtaining, by the first network device, first alarm information of the PDH frame data. The first alarm information is used to indicate monitored quality of the PDH frame data. For example, the first alarm information indicates whether the PDH frame data carries valid data (for example, whether the PDH frame data is a null packet) or whether there is bit-level bit error information.

That the first network device performs virtual-container mapping processing on the PDH frame data to obtain the virtual container that includes the PDH frame data specifically includes:

placing, by the first network device, the first alarm information in the POH. The alarm information of the PDH frame data is transmitted to a second network device by using the Ethernet. The second network device obtains the first alarm information, and learns of the monitored quality of the PDH frame data, for example, whether the PDH frame data carries valid data or whether there is bit-level bit error information.

Optionally, before the first network device obtains the virtual-container PWE3 packet according to the virtual-container PWE3 encapsulated data, the method further includes:

obtaining, by the first network device, second alarm information. The second alarm information is used to indicate a status of an Ethernet path between the first network device and the second network device, for example, indicate that the Ethernet path is faulty.

That the first network device performs virtual-container mapping processing on the PDH frame data to obtain the virtual container that includes the PDH frame data may further include:

placing, by the first network device, the second alarm information in the POH. The status of the Ethernet path between the first network device and the second network device is transmitted to the second network device.

303. The first network device performs virtual-container pseudo-wire emulation edge-to-edge PWE3 encapsulation on the virtual container to obtain virtual-container PWE3 encapsulated data.

The PWE3 encapsulation is a layer-2 bearer technology of implementing, in a packet switched network (PSN), an emulated basic behavior and feature of a service such as an asynchronous transfer mode (ATM), a frame relay, a low-rate time division multiplexing (TDM) circuit, a synchronous optical network (SONET), and an SDH.

Figure 4:
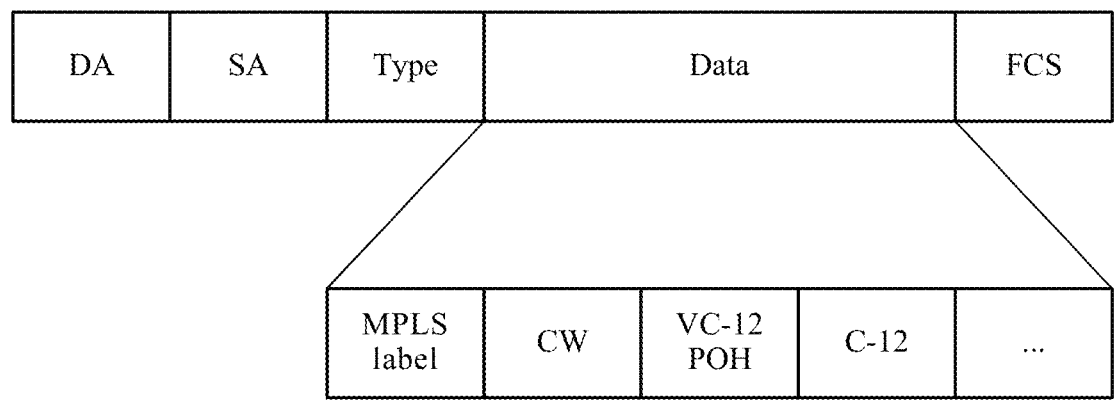
FIG. 4 is a schematic structural diagram of a PWE3 packet according to an embodiment of the invention.

The virtual-container PWE3 encapsulated data may include the POH of the virtual container and the container corresponding to the virtual container. The PDH frame data is stored in the container. Specifically, as shown in FIG. 4, the virtual-container PWE3 encapsulated data may be a Data part in FIG. 4. In this case, the virtual-container PWE3 encapsulated data may include a pseudo-wire (PW) label, a control word (CW), a Multiprotocol Label Switching (MPLS) label, a VC-n POH (virtual container path overhead), and a C-n (container). Optionally, the virtual-container PWE3 encapsulated data may further include a Real-Time Transport Protocol (RTP) extension header and the like.

304. The first network device obtains the virtual-container PWE3 packet according to the virtual-container PWE3 encapsulated data.

The virtual-container PWE3 packet may be obtained by adding, to the virtual-container PWE3 encapsulated data, a fixed component that is in an Ethernet frame format and that is specified in a standard protocol. The fixed component in the Ethernet frame format includes a destination address (DA), a source address (SA), a frame data type (Type), a frame check sequence (FCS), a virtual local area network (VLAN) identifier, and the like. FIG. 4 shows an embodiment of a specific structure of the virtual-container PWE3 packet.

305. The first network device sends the virtual-container PWE3 packet to the second network device by using the Ethernet.

In this embodiment, virtual-container mapping processing is directly performed on the PDH frame data without a need to directly obtain an actual value of the clock frequency of the PDH frame data, and the information about the clock frequency difference between the clock frequency of the Ethernet and the clock frequency of the PDH frame data is reflected by using the stuffing bit, so that difficulty in recovering the clock frequency of the PDH frame data when the PDH frame data is transmitted in the Ethernet is reduced, clock frequency jitters and drifts caused by the clock frequency recovery are reduced, and user experience is improved.

In this case, the second network device receives the virtual-container PWE3 packet sent by the first network device. The virtual-container PWE3 packet includes the PDH frame data.

306. The second network device performs virtual-container PWE3 decapsulation on the virtual-container PWE3 packet to obtain the virtual container that includes the PDH frame data.

The second network device performs virtual-container PWE3 decapsulation on the virtual-container PWE3 packet to obtain the virtual container that includes the PDH frame data. The virtual container further includes the stuffing bit. The stuffing bit carries the information about the clock frequency difference between the clock frequency of the Ethernet and the clock frequency of the PDH frame data.

Optionally, the virtual-container PWE3 packet includes the POH of the virtual container and the container corresponding to the virtual container. The PDH frame data is stored in the container, and may be specifically in a packet format shown in FIG. 4.

Optionally, the POH of the virtual container further includes the first alarm information. The first alarm information is used to indicate the monitored quality of the PDH frame data.

After the second network device performs virtual-container PWE3 decapsulation on the virtual-container PWE3 packet, the method may further include:

extracting, by the second network device, the first alarm information from the POH.

Optionally, the POH of the virtual container further includes the second alarm information. The second alarm information is used to indicate the status of the Ethernet path between the first network device and the second network device.

Before the second network device performs virtual-container PWE3 decapsulation on the virtual-container PWE3 packet, the method further includes:

extracting, by the second network device, the second alarm information from the POH.

Optionally, in this embodiment of the invention, multiple virtual containers obtained after the virtual-container PWE3 decapsulation may be multiplexed by using interleaving, to obtain a high rate signal. Therefore, the method further includes:

obtaining, by the second network device, multiple virtual containers obtained after the virtual-container PWE3 decapsulation, and multiplexing the multiple virtual containers into line units by using interleaving.

In an SDH technology, multiplexing is a process in which lower order path layer signals are adapted into a higher order path or multiple higher order path layer signals are adapted into a multiplex section. The SDH multiplexing has a standardized multiplex structure, but each country or region has only one type of multiplex path diagram that is implemented by using a combination of hardware and software and that is flexible and convenient. However, byte interleaving division multiplexing (BIDM) is an SDH manner of multiplexing lower level synchronous transport modules (STM) into a higher level synchronous transport module. The higher level STM is the quadruple of the lower level STM. For example, four STM-1s are multiplexed into one STM-4 by using byte interleaving. Certainly, four STM-4s are multiplexed into one STM-16 in a same manner. A multiplexing case of a synchronous transport module at another level is similar to this case. The byte interleaving herein means that one byte is regularly and separately extracted from the four STM-1s and then is placed in the STM-4.

Byte interleaving division multiplexing is performed. First, a design idea of SDH synchronous multiplexing is reflected. Second, a position of a lower rate signal in a higher rate signal may be obtained by using a value of an AU-PTR (administration unit pointer) and by using byte interleaving regularity, so that the lower rate signal may be easily extracted from or inserted into the higher rate signal.

Figure 5:
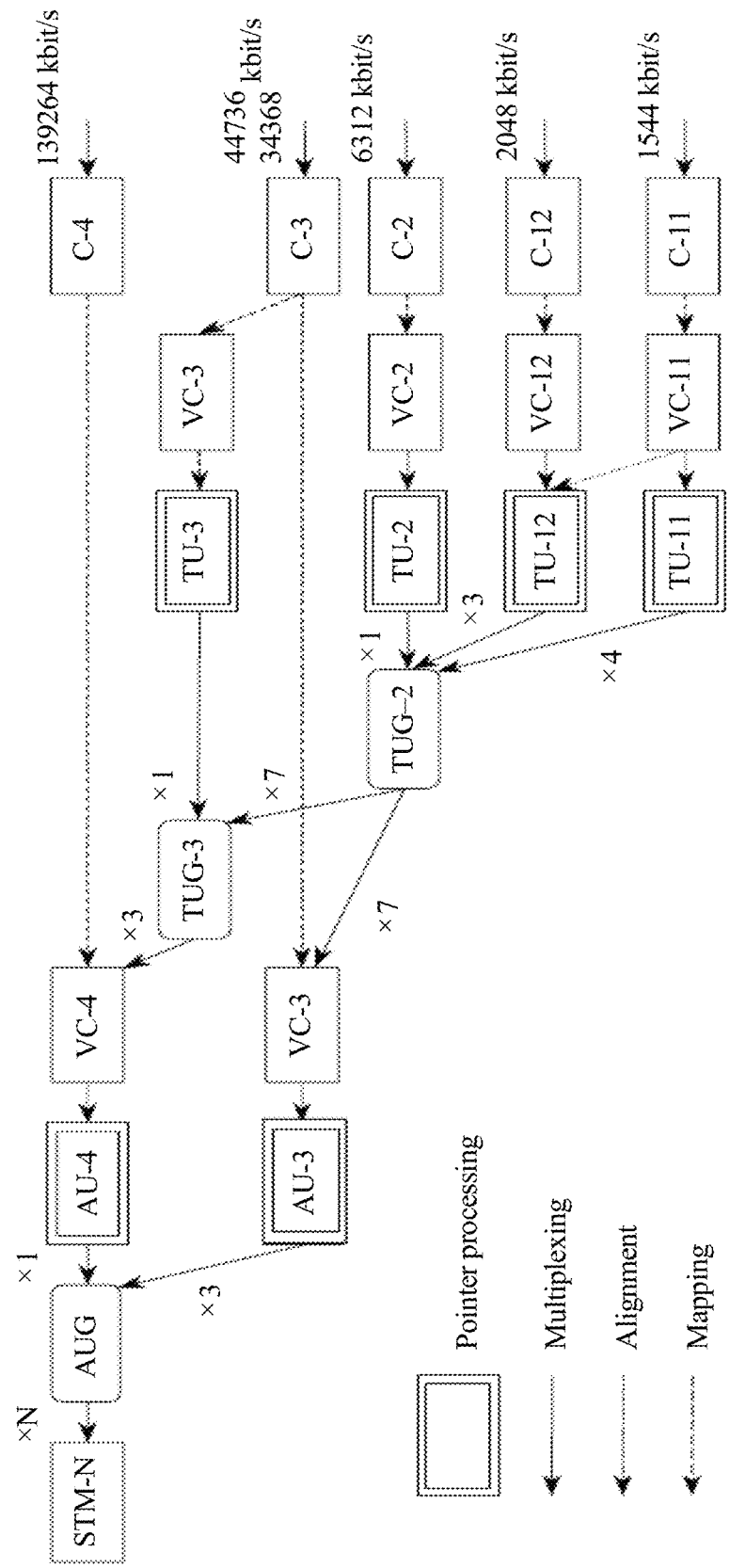
FIG. 5 is a schematic diagram of a multiplex path in an SDH technology according to an embodiment of the invention.

FIG. 5 is a schematic diagram of multiplexing in the SDH technology. TU represents a tributary unit. TUG represents a tributary unit group, and currently includes four types of tributary units, that is, TU-n (n=11, 12, 2, and 3). The TU-n includes a corresponding lower order VC-n and a corresponding tributary unit pointer (TU-n PTR). The tributary unit pointer (TU-n PTR) indicates an offset of a VC-n payload start relative to a higher order VC frame start. One TU or a set of multiple TUs, occupying fixed and defined positions in a higher order VC payload is referred to as a tributary unit group (TUG). AU represents an administration unit. AUG represents an administration unit group. The AU includes an AU3 and an AU4. A number in FIG. 5 indicates that a structure on the left of the number is equal to a value obtained by multiplying a structure on the right of the number by the number, for example, VC-3=7×TUG-2.

In this embodiment, rates of virtual containers that carry PDH services are the same (for example, are all E1), or are in a fixed proportion relationship (for example, there is a quadruple relationship between E2 and E1). Therefore, an intra-rate interleaving division multiplexing technology is easily implemented, so as to improve packet processing efficiency, and save bandwidth.

In this embodiment, the second network device may parse out the clock frequency of the PDH frame data, or may transmit the PDH frame data to an SDH network element for processing. Therefore, optionally, the method may further include:

performing, by the second network device, virtual-container demapping processing on the virtual container to obtain the PDH frame data and the stuffing bit that are stored in the virtual container;

obtaining, by the second network device, the information about the clock frequency difference according to the stuffing bit; and obtaining, by the second network device, the clock frequency of the PDH frame data according to the information about the clock frequency difference and a clock frequency of the second network device.

Figure 6:
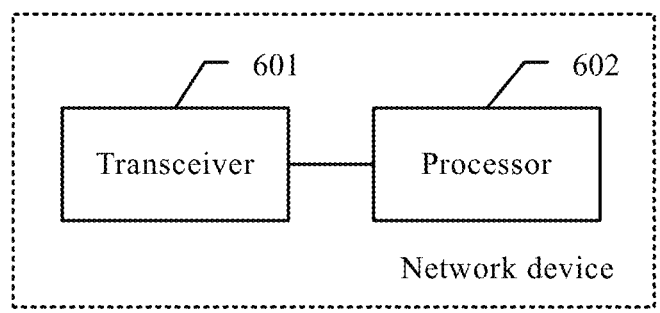
FIG. 6 is a schematic diagram of an embodiment of a network device according to an embodiment of the invention.
Figure 7:
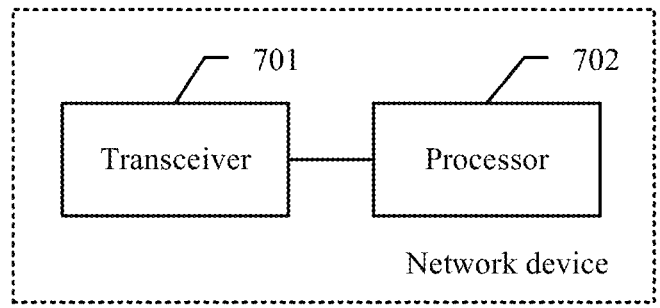
FIG. 7 is a schematic diagram of another embodiment of a network device according to an embodiment of the invention.

The following describes an embodiment of a network device according to an embodiment of the invention. FIG. 6 and FIG. 7 show schematic diagrams of possible hardware structures of the first network device and the second network device in the method provided in the embodiment in FIG. 3. The first network device may be a first network device shown in FIG. 6, and the second network device may be a second network device shown in FIG. 7. The first network device shown in FIG. 6 and the second network device shown in FIG. 7 may be configured to perform the method described in the embodiment in FIG. 3.

As shown in FIG. 6, the first network device in the embodiment of the invention includes a transceiver 601 and a processor 602 (there may be one or more processors).

The first network device in the embodiment of the invention may have more or fewer parts than those shown in FIG. 6, may combine two or more parts, or may have different part configurations or settings. The parts may be implemented by using hardware including one or more signal processing and/or application-specific integrated circuits, by using software, or by using a combination of hardware and software.

The transceiver 601 is configured to receive and transmit plesiochronous digital hierarchy PDH frame data.

The processor 602 is configured to perform virtual-container mapping processing on the PDH frame data: load the PDH frame data and a stuffing bit into a virtual container, to obtain the virtual container that includes the PDH frame data. The stuffing bit carries information about a clock frequency difference between a clock frequency of the Ethernet and a clock frequency of the PDH frame data.

The processor 602 is further configured to: perform virtual-container pseudo-wire emulation edge-to-edge PWE3 encapsulation on the virtual container to obtain virtual-container PWE3 encapsulated data; and obtain the virtual-container PWE3 packet according to the virtual-container PWE3 encapsulated data.

The transceiver 601 is configured to send the virtual-container PWE3 packet to the second network device by using the Ethernet.

Optionally, the processor 602 is further configured to: before performing virtual-container mapping processing on the PDH frame data to obtain the virtual container that includes the PDH frame data, obtain first alarm information, and place the first alarm information in a path overhead POH of the virtual container. The first alarm information is used to indicate monitored quality of the PDH frame data.

Optionally, the processor 602 is further configured to: before obtaining the virtual-container PWE3 packet according to the virtual-container PWE3 encapsulated data, obtain second alarm information, and place the second alarm information in the POH of the virtual container. The second alarm information is used to indicate a status of an Ethernet path between the first network device and the second network device.

In at least one embodiment, the processor 602 may be one or more central processing units (CPU). When the processor 602 is one CPU, the CPU may be a single-core CPU, or may be a multi-core CPU.

As shown in FIG. 7, the second network device includes a transceiver 701 and a processor 702 (there may be one or more processors).

The network device in the embodiment of the invention may have more or fewer parts than those shown in FIG. 7, may combine two or more parts, or may have different part configurations or settings. The parts may be implemented by using hardware including one or more signal processing and/or application-specific integrated circuits, by using software, or by using a combination of hardware and software.

The transceiver 701 is configured to receive the virtual-container PWE3 packet sent by the first network device. The virtual-container PWE3 packet includes the PDH frame data.

The processor 702 is configured to perform virtual-container PWE3 decapsulation on the virtual-container PWE3 packet to obtain the virtual container that includes the PDH frame data. The virtual container further includes the stuffing bit, and the stuffing bit carries the information about the clock frequency difference between the clock frequency of the Ethernet and the clock frequency of the PDH frame data.

Optionally, the POH of the virtual container includes the first alarm information. The first alarm information is used to indicate the monitored quality of the PDH frame data.

The processor 702 is further configured to extract the first alarm information from the POH after performing virtual-container PWE3 decapsulation on the virtual-container PWE3 packet.

Optionally, the POH of the virtual container includes the second alarm information. The second alarm information is used to indicate the status of the Ethernet path between the first network device and the second network device.

The processor 702 is further configured to extract the second alarm information from the POH before performing virtual-container PWE3 decapsulation on the virtual-container PWE3 packet.

Optionally, the processor 702 is further configured to: obtain multiple virtual containers obtained after the virtual-container PWE3 decapsulation, and multiplex the multiple virtual containers into tributary units by using interleaving.

Optionally, the processor 702 is further configured to: perform virtual-container demapping processing on the virtual container to obtain the PDH frame data and the stuffing bit that are stored in the virtual container; obtain the information about the clock frequency difference according to the stuffing bit; and obtain the clock frequency of the PDH frame data according to the information about the clock frequency difference and a clock frequency of the second network device.

In at least one embodiment, the processor 702 may be one or more central processing units (CPUs). When the processor 702 is one CPU, the CPU may be a single-core CPU, or may be a multi-core CPU.

Figure 8:
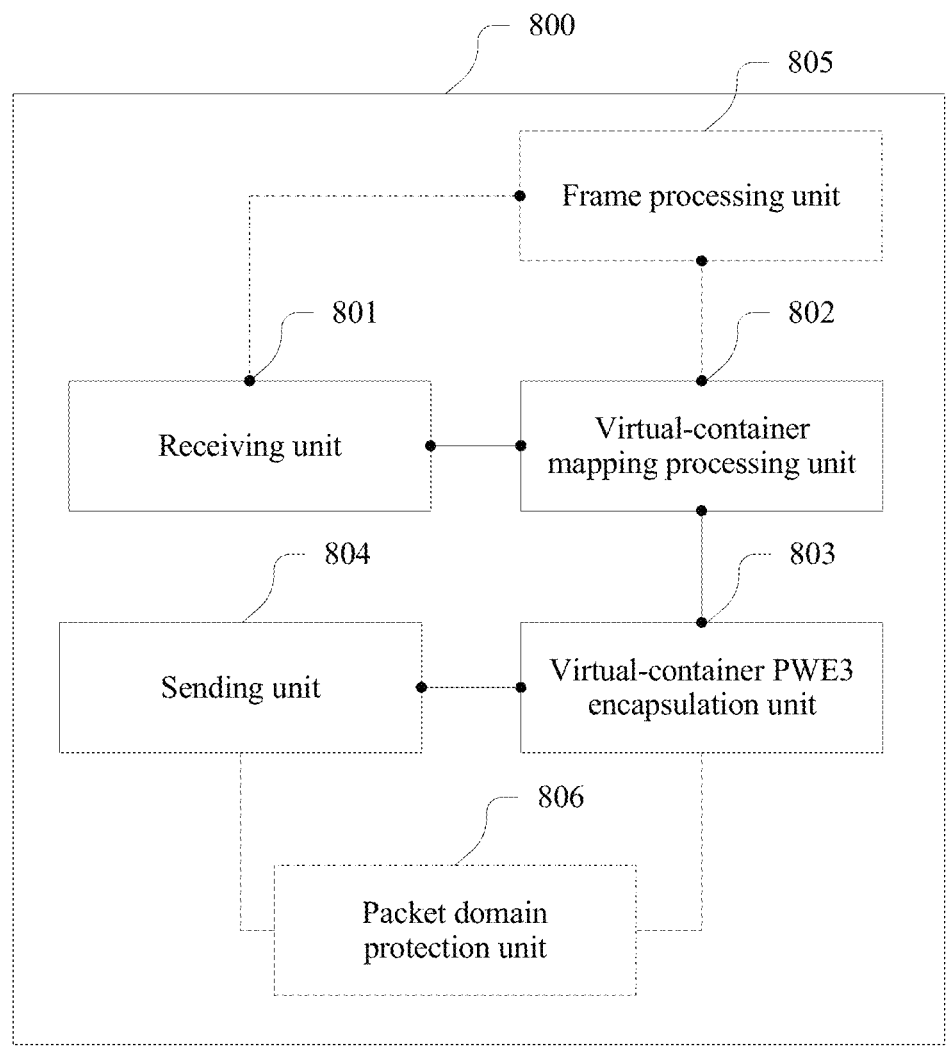
FIG. 8 is a schematic diagram of another embodiment of a network device according to an embodiment of the invention.

FIG. 8 shows another embodiment of a network device according to an embodiment of the invention. The network device is corresponding to the first network device in the embodiment shown in FIG. 3. The network device is applied to Ethernet. The Ethernet further includes a target network device (corresponding to the second network device in the embodiment shown in FIG. 3). The network device is connected to the target network device by using the Ethernet. The network device 800 includes:

a receiving unit 801, configured to receive plesiochronous digital hierarchy PDH frame data:

a virtual-container mapping processing unit 802, configured to perform virtual-container mapping processing on the PDH frame data: load the PDH frame data and a stuffing bit into a virtual container, to obtain the virtual container that includes the PDH frame data, where the stuffing bit carries information about a clock frequency difference between a clock frequency of the Ethernet and a clock frequency of the PDH frame data:

a virtual-container PWE3 encapsulation unit 803, configured to perform virtual-container pseudo-wire emulation edge-to-edge PWE3 encapsulation on the virtual container to obtain virtual-container PWE3 encapsulated data; and a sending unit 804, configured to: obtain the virtual-container PWE3 packet according to the virtual-container PWE3 encapsulated data, and send the virtual-container PWE3 packet to the target network device by using the Ethernet.

Optionally, the network device further includes:

a frame processing unit 805, configured to: before the virtual-container mapping processing unit performs virtual-container mapping processing on the PDH frame data to obtain the virtual container that includes the PDH frame data, obtain first alarm information, and place the first alarm information in the POH, where the first alarm information is used to indicate monitored quality of the PDH frame data.

Optionally, the network device further includes:

a packet domain protection unit 806, configured to: before the virtual-container mapping processing unit performs virtual-container mapping processing on the PDH frame data to obtain the virtual container that includes the PDH frame data, obtain second alarm information, and place the second alarm information in the POH, where the second alarm information is used to indicate a status of an Ethernet path between the first network device and the second network device.

The receiving unit 801 and the sending unit 804 may be implemented by using the transceiver 601 in FIG. 6. The virtual-container mapping processing unit 802, the virtual-container PWE3 encapsulation unit 803, the frame processing unit 805, and the packet domain protection unit 806 may be implemented by using one or more processors 602 in FIG. 6.

The foregoing units may be logical units, for example, may be functional components generated after a central processing unit (CPU) reads and runs software code stored in a memory. The memory may be but is not limited to one or more of a random access memory (RAM), a read-only memory (ROM), a compact disc read-only memory (CD-ROM), or an erasable programmable read only memory (EPROM). Alternatively, the foregoing units may be implemented by using hardware related to a program instruction. The hardware may be various devices well-known to one of ordinary skill in the art, for example, may be a network processor (NP).

For the network device provided in the foregoing embodiment, division of the foregoing functional modules is merely used as an example for description. During actual application, the foregoing functions may be allocated to different functional modules for implementation according to a requirement. That is, an internal structure of the device is divided into different functional modules to implement all or some of the functions described above.

Figure 9:
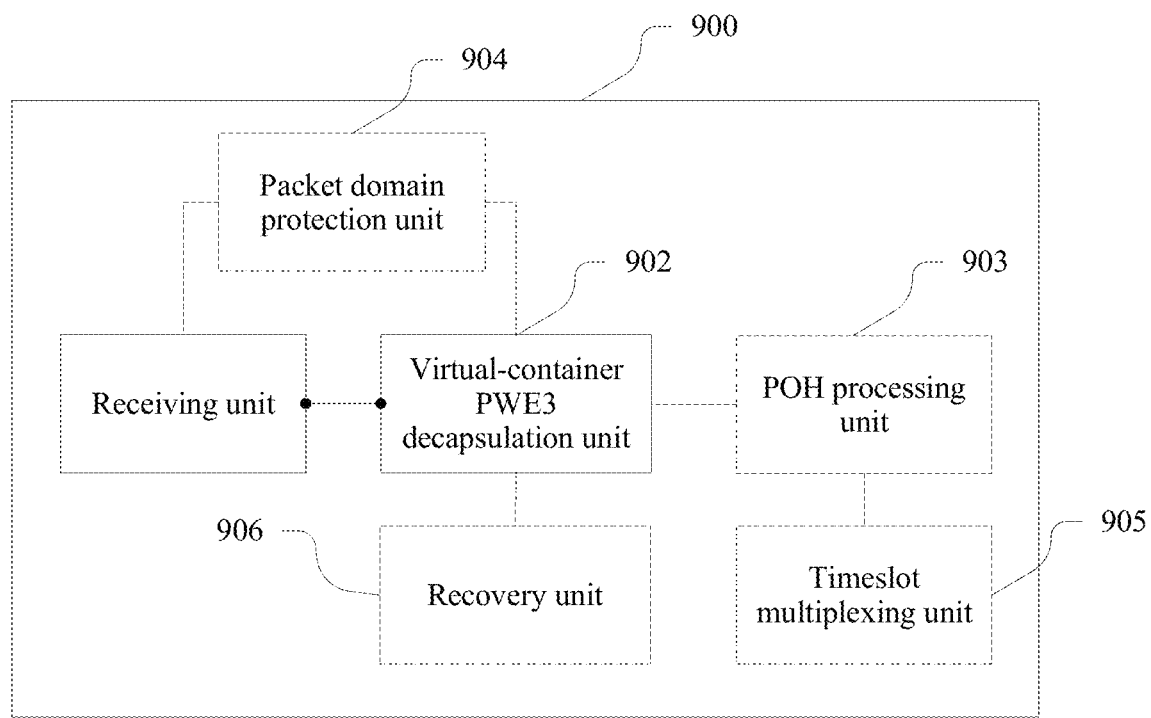
FIG. 9 is a schematic diagram of another embodiment of a network device according to an embodiment of the invention.

FIG. 9 is an embodiment of another network device according to an embodiment of the invention. The network device is corresponding to the second network device in FIG. 3. The network device is applied to Ethernet. The Ethernet further includes a target network device (corresponding to the first network device in the embodiment shown in FIG. 3). The network device is connected to the target network device by using the Ethernet. The network device 900 includes:

a receiving unit 901, configured to receive a virtual-container PWE3 packet sent by the target network device, where the virtual-container PWE3 packet includes PDH frame data: and a virtual-container PWE3 decapsulation unit 902, configured to perform virtual-container PWE3 decapsulation on the virtual-container PWE3 packet to obtain a virtual container that includes the PDH frame data, where the virtual container further includes a stuffing bit, and the stuffing bit carries information about a clock frequency difference between a clock frequency of the Ethernet and a clock frequency of the PDH frame data.

Optionally, a POH of the virtual container includes first alarm information. The first alarm information is used to indicate monitored quality of the PDH frame data.

The network device further includes:

a POH processing unit 903, configured to extract the first alarm information from the POH before the virtual-container PWE3 decapsulation unit performs virtual-container PWE3 decapsulation on the virtual-container PWE3 packet.

Optionally, the POH of the virtual container further includes second alarm information. The second alarm information is used to indicate a status of an Ethernet path between the network device and the target network device.

The network device further includes:

a packet domain protection unit 904, configured to extract the second alarm information from the POH before the virtual-container PWE3 decapsulation unit performs virtual-container PWE3 decapsulation on the virtual-container PWE3 packet.

Optionally, the network device further includes:

a timeslot multiplexing unit 905, configured to: obtain multiple virtual containers obtained after the virtual-container PWE3 decapsulation, and multiplex the multiple virtual containers into tributary units by using interleaving.

Optionally, the network device further includes:

a recovery unit 906, configured to: perform virtual-container demapping processing on the virtual container to obtain the PDH frame data and the stuffing bit that are stored in the virtual container; obtain the information about the clock frequency difference according to the stuffing bit; and obtain the clock frequency of the PDH frame data according to the information about the clock frequency difference and a clock frequency of the network device.

The receiving unit 901 may be implemented by using the transceiver 701 in FIG. 7. The virtual-container PWE3 decapsulation unit 902, the POH processing unit 903, the timeslot multiplexing unit 904, and the recovery unit 905 may be implemented by using one or more processors 702 in FIG. 7.

The foregoing units may be logical units, for example, may be functional components generated after a central processing unit (CPU) reads and runs software code stored in a memory. The memory may be but is not limited to one or more of a random access memory (RAM), a read-only memory (ROM), a compact disc read-only memory (CD-ROM), or an erasable programmable read only memory (EPROM). Alternatively, the foregoing units may be implemented by using hardware related to a program instruction. The hardware may be various devices well-known to one of ordinary skill in the art, for example, may be a network processor (NP).

For the network device provided in the foregoing embodiment, division of the foregoing functional modules is merely used as an example for description. During actual application, the foregoing functions may be allocated to different functional modules for implementation according to a requirement. That is, an internal structure of the device is divided into different functional modules to implement all or some of the functions described above.

An embodiment of the invention further provides a communications system, including a first network device and a second network device. The first network device is coupled with the second network device by using Ethernet. The first network device is any first network devices described above. The second network device is any second network device described above.

One of ordinary skill in the art should be aware that in the foregoing one or more examples, functions described in the invention may be implemented by using hardware, software, firmware, or any combination thereof. When the functions are implemented by using software, the functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another place. The storage medium may be any available medium that can be accessed by a general-purpose or dedicated computer, and includes but is not limited to any medium that can store program code, such as a USB flash drive, a removable hard disk, a read-only memory (ROM), a random access memory (RAM), a magnetic disk, or an optical disc.

One of ordinary skill in the art may clearly know that, for convenient and brief description, in the foregoing embodiments, the embodiments emphasize different aspects, and for a part not described in detail in one embodiment, refer to relevant description in another embodiment.

It should be noted that, for brief description, the foregoing method embodiments are represented as a combination of a series of actions. However, one of ordinary skill in the art should appreciate that the invention is not limited to the described order of the actions, because according to the invention, some operations may be performed in other orders or simultaneously. It should be further appreciated by one of ordinary skill in the art that the embodiments described in this specification all belong to examples of the embodiments, and the actions and modules are not necessarily mandatory.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings, direct couplings, or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected according to actual requirements, to achieve the objectives of the solutions in the embodiments.

In addition, the functional units in the embodiments of the invention may be integrated into one processing unit, or each of the units may exist alone physically, or two or more units are integrated into one unit. The integrated unit may be implemented in a form of hardware, or may be implemented in a form of a software functional unit.

In conclusion, the foregoing embodiments are merely intended for describing the technical solutions in embodiments of the invention, but not for limiting the scope of the embodiments of the invention. Although this application describes in detail the foregoing embodiments, one of ordinary skill in the art should understand that they may still make modifications to the technical solutions described in the foregoing embodiments or make equivalent replacements to some technical features thereof, without departing from the scope of the technical solutions in the embodiments of the invention.

What is claimed is:

1. A method for processing data in Ethernet, wherein the Ethernet comprises a first network device and a second network device, the first network device is coupled with the second network device by using the Ethernet, and the method comprising:

receiving, by the second network device, a virtual-container pseudo-wire emulation edge-to-edge (PWE3) packet sent by the first network device, wherein the virtual-container PWE3 packet comprises plesiochronous digital hierarchy (PDH) frame data and a stuffing bit, wherein the stuffing bit carries information about a clock frequency difference between a clock frequency of the Ethernet and a clock frequency of the PDH frame data;

performing, by the second network device, virtual-container PWE3 decapsulation on the virtual-container PWE3 packet to obtain a virtual container;

performing, by the second network device, virtual-container demapping processing on the virtual container to obtain the PDH frame data and the stuffing bit that are stored in the virtual container; and determining, by the second network device, the clock frequency of the PDH frame data based on the stuffing bit and a clock frequency of the second network device that is the clock frequency of the Ethernet, wherein a clock frequency obtained by adding the stuffing bit to the clock frequency of the PDH frame data is equal to one of the clock frequency of the Ethernet, a rate obtained after the clock frequency of the Ethernet is divided, or a rate obtained after the clock frequency of the Ethernet is multiplied.

2. The method according to claim 1, wherein a path overhead (POH) of the virtual container comprises first alarm information, and the first alarm information is used to indicate monitored quality of the PDH frame data; and after the performing, by the second network device, the virtual-container PWE3 decapsulation on the virtual-container PWE3 packet, the method further comprises:

extracting, by the second network device, the first alarm information from the POH.

3. The method according to claim 2, wherein the path overhead POH of the virtual container comprises second alarm information, and the second alarm information is used to indicate a status of an Ethernet path between the first network device and the second network device; and before the performing, by the second network device, the virtual-container PWE3 decapsulation on the virtual-container PWE3 packet, the method further comprises:

extracting, by the second network device, the second alarm information from the POH.

4. The method according to claim 1, wherein the method further comprises:

obtaining, by the second network device, multiple virtual containers obtained after the virtual-container PWE3 decapsulation, and multiplexing the multiple virtual containers into tributary units by using interleaving.

5. A network device, applied to Ethernet, wherein the Ethernet comprises a target network device, the network device is coupled with the target network device by using the Ethernet, the network device comprising:

a non-transitory memory comprising instructions;

a processor in communication with the memory, wherein the processor is configured to execute the instructions to:

receive plesiochronous digital hierarchy (PDH) frame data;

perform virtual-container mapping processing on the PDH frame data to load the PDH frame data and a stuffing bit into a virtual container, to obtain the virtual container that comprises the PDH frame data and the stuffing bit;

perform virtual-container pseudo-wire emulation edge-to-edge (PWE3) encapsulation on the virtual container to obtain virtual-container PWE3 encapsulated data; and obtain the virtual-container PWE3 packet according to the virtual-container PWE3 encapsulated data, and send the virtual-container PWE3 packet comprising the stuffing bit to the target network device by using the Ethernet, wherein the stuffing bit is configured to indicate a clock frequency difference between a clock frequency of the Ethernet and a clock frequency of the PDH frame data for the target device to determine the clock frequency of the PDH frame data based on the stuffing bit and a clock frequency of target device that is the clock frequency of the Ethernet, wherein a clock frequency obtained by adding the stuffing bit to the clock frequency of the PDH frame data is equal to one of the clock frequency of the Ethernet, a rate obtained after the clock frequency of the Ethernet is divided, or a rate obtained after the clock frequency of the Ethernet is multiplied.

6. The network device according to claim 5, wherein the processor is further configured to execute the instructions to:

before the virtual-container mapping processing unit performs virtual-container mapping processing on the PDH frame data to obtain the virtual container that comprises the PDH frame data, obtain first alarm information, and place the first alarm information in a path overhead (POH) of the virtual container, wherein the first alarm information is used to indicate monitored quality of the PDH frame data.

7. The network device according to claim 5, wherein the processor is further configured to execute the instructions to:

before the first network device obtains the virtual-container PWE3 packet according to the virtual-container PWE3 encapsulated data, obtain second alarm information, and place the second alarm information in the POH of the virtual container, wherein the second alarm information is used to indicate a status of an Ethernet path between the network device and the target network device.

8. A network device, applied to Ethernet, wherein the Ethernet further comprises a target network device, the network device is coupled with the target network device by using the Ethernet, the network device comprising:

a non-transitory memory comprising instructions;

a processor in communication with the memory, wherein the processor is configured to execute the instructions to:

receive a virtual-container pseudo-wire emulation edge-to-edge (PWE3) packet sent by the target network device, wherein the virtual-container PWE3 packet comprises plesiochronous digital hierarchy (PDH) frame data and a stuffing bit, wherein the stuffing bit carries information about a clock frequency difference between a clock frequency of the Ethernet and a clock frequency of the PDH frame data;

perform virtual-container PWE3 decapsulation on the virtual-container PWE3 packet to obtain a virtual container;

perform virtual-container demapping processing on the virtual container to obtain the PDH frame data and the stuffing bit that are stored in the virtual container; and determine the clock frequency of the PDH frame data based on the stuffing bit and a clock frequency of the network device that is the clock frequency of the Ethernet, wherein a clock frequency obtained by adding the stuffing bit to the clock frequency of the PDH frame data is equal to one of the clock frequency of the Ethernet, a rate obtained after the clock frequency of the Ethernet is divided, or a rate obtained after the clock frequency of the Ethernet is multiplied.

9. The network device according to claim 8, wherein a path overhead (POH) of the virtual container comprises first alarm information, and the first alarm information is used to indicate monitored quality of the PDH frame data; and the processor is further configured to execute the instructions to:

extract the first alarm information from the POH after performing virtual-container PWE3 decapsulation on the virtual-container PWE3 packet.

10. The network device according to claim 9, wherein the path overhead (POH) of the virtual container further comprises second alarm information, and the second alarm information is used to indicate a status of an Ethernet path between the network device and the target network device; and the processor is further configured to execute the instructions to:

extract the second alarm information from the POH before performing virtual-container PWE3 decapsulation on the virtual-container PWE3 packet.

11. The network device according to claim 8, wherein the processor is further configured to execute the instructions to:
obtain multiple virtual containers after the virtual-container PWE3 decapsulation, and multiplex the multiple virtual containers into tributary units by using interleaving.

* * * * *

UNITED STATES PATENT AND TRADEMARK OFFICE
CERTIFICATE OF CORRECTION

PATENT NO. : 10,931,578 B2
APPLICATION NO. : 16/162163
DATED : February 23, 2021
INVENTOR(S) : Fan Zhang, Ming Zhou and Hui Wang It is certified that error appears in the above-identified patent and that said Letters Patent is hereby corrected as shown below:

In the Claims

In Claim 5, Column 19, Line 56, "target device" should be --target network device--.

In Claim 5, Column 19, Line 58, "of target device" should be --of the target network device--.

In Claim 5, Column 19, Line 63, "after the clock" should be --after a clock--.

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*